United States Patent [19]

Clark

[11] Patent Number: 4,759,517

[45] Date of Patent: Jul. 26, 1988

[54] STATION-KEEPING USING SOLAR SAILING

[75] Inventor: John F. Clark, Princeton, N.J.

[73] Assignee: General Electric Company, East Windsor, N.J.

[21] Appl. No.: 392,006

[22] Filed: Jun. 25, 1982

[51] Int. Cl.[4] .................................. B64G 1/24
[52] U.S. Cl. .................................. 244/168; 244/172
[58] Field of Search ................ 244/158 R, 159, 168, 244/173, 172

[56] References Cited

U.S. PATENT DOCUMENTS 3,239,165  3/1966  Sohn .
3,588,000  6/1971  Buckingham et al. ............ 244/168
4,262,867  4/1981  Piening ........................... 244/168

FOREIGN PATENT DOCUMENTS 2537577  3/1977  Fed. Rep. of Germany .
2604005  8/1977  Fed. Rep. of Germany .
1364354  5/1964  France .
1091307  11/1967  United Kingdom .

OTHER PUBLICATIONS

Helvey, "Space Trajectories" Academic Press, pp. 187, 189–191, 1960.

Primary Examiner—Galen Barefoot
Attorney, Agent, or Firm—Clement A. Berard, Jr.

[57] ABSTRACT

Satellite is maintained in the geostationary orbit about the equator by use of solar sails. These solar sails are oriented to use the sun's radiation pressure to sail the satellite in a first direction for a first portion of the orbit and in a second opposite direction during a second portion of the orbit to counteract the forces tending to pull the satellite out of its equatorial orbit.

10 Claims, 2 Drawing Sheets

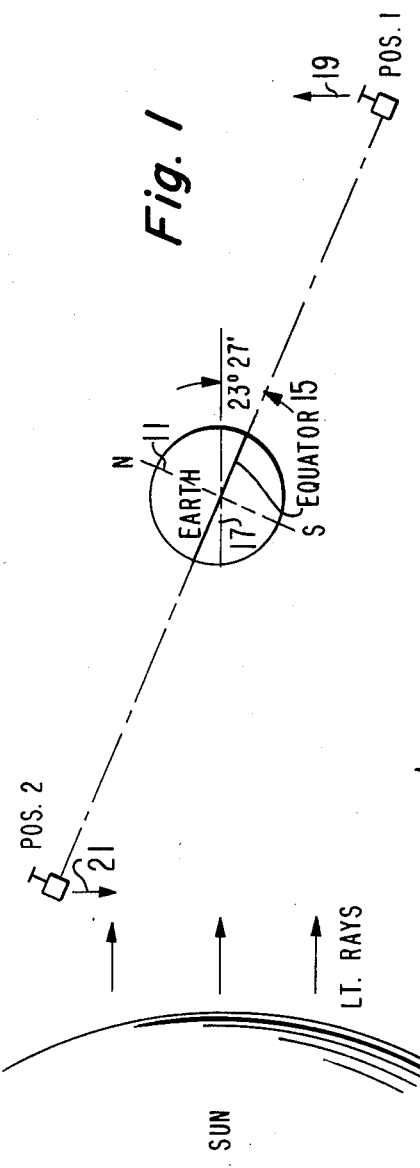
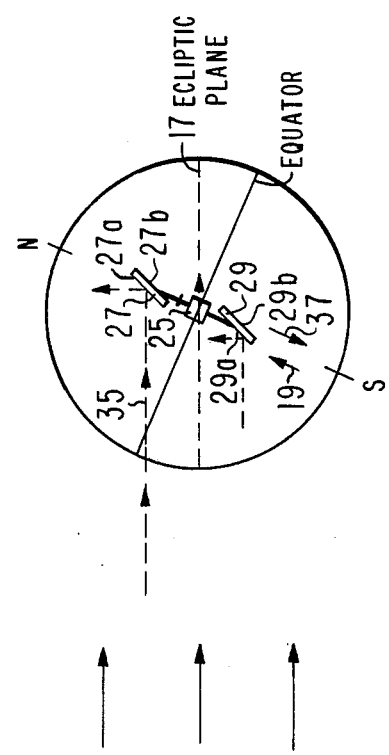

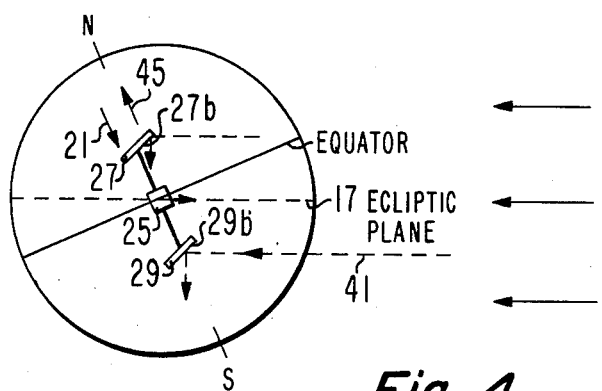
Fig. 4
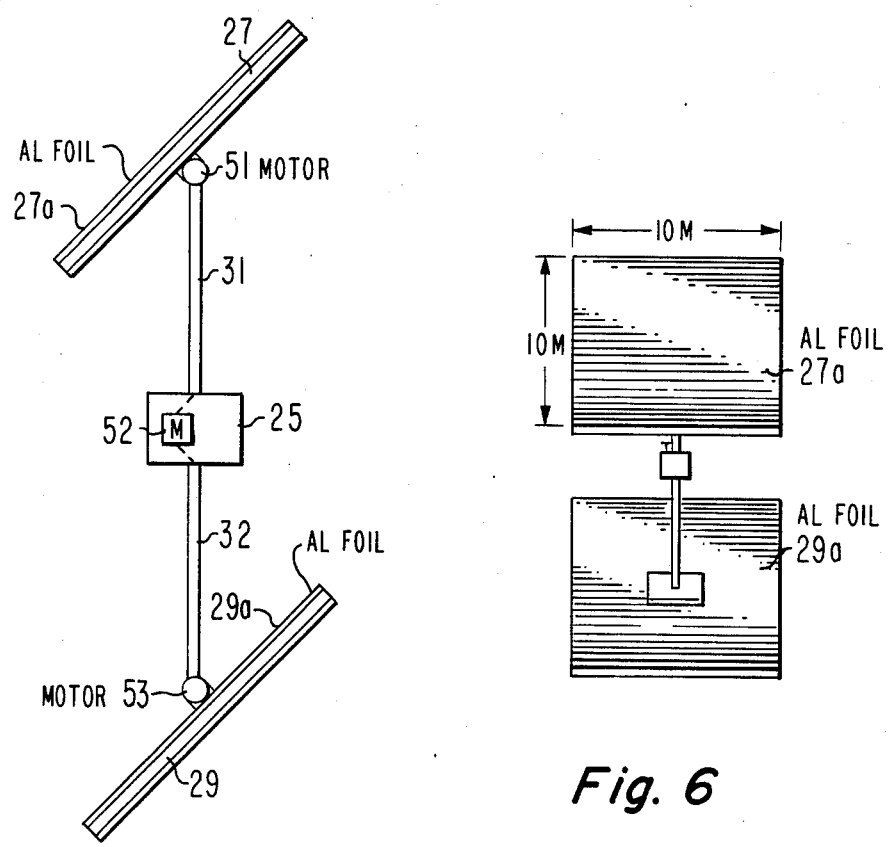
Fig. 5
Fig. 6

STATION-KEEPING USING SOLAR SAILING

This invention relates to the use of solar radiation pressure for achieving and maintaining a satellite in a given orbit and more particularly to north-south station keeping.

This invention has particular application to a geostationary satellite which follows a circular path in the earth's equatorial plane at about 35,803 kilometers above sea level, and which rotates about the earth's polar axis in synchronism with the earth's own rotation once every 23 hour 56 minute sidereal day. In this geostationary orbit the satellite appears to hover in one spot in relation to any location on the earth's surface, irrespective of the rotation of the earth. The portion of such a satellite which contains the antenna can be rotated once a day relative to inertial space so that the antenna always points to the earth and to the same location on the earth. This has particular application to communication satellites. At this geostationary altitude of 35,803 kilometers (22,300 miles) from the earth's surface at sea level, the orbital plane continually tends to twist out of the equatorial plane and toward the plane of the ecliptic. This does not occur at very low altitudes where the stable orbit approaches the plane of the earth's equator. However, at the geostationary altitude, the combined gravitational pull of the solar system on the satellite is such that the equilibrium geostationary orbital plane is inclined about 7.35°±1.03° to the equator, varying over the 18.61 year lunar nodal regression period with the right ascension of the ascending node of approximately zero. Any other geostationary orbital plane precesses around the equilibrium plane with a period of about 53 years. In order to repeatedly correct this inclination due to the twisting of the orbital plane from that of the equator, some 90% of the station-keeping propellant of the spacecraft is required to do north-south station keeping, to keep the orbital and earth's equatorial planes coincident. For a 10 year lifetime, approximately one-fourth of a current geostationary satellite's mass is devoted to the hydrazine system and the propellant to carry out its station-keeping. Included are propulsive maneuvers along the north-south and east-west axes.

In accordance with applicant's teaching, north-south station-keeping control of the satellite is achieved using radiation pressure from the sun. While heretofore such radiation pressure has been proposed for causing rotation and attitude control there has been no suggestion for its use for station-keeping.

U.S. Pat. No. 3,588,000 of Buckingham et al. teaches correcting for the orbit period which is upset when a reflector is positioned to illuminate a portion of the dark side of the earth. This patent of Buckingham et al. teaches that the reflector is oriented on lhe sun's side of the earth so that the sun's radiation pressure adjusts the orbit period.

Another patent, U.S. Pat. No. 4,262,867, describes position and attitude control of spacecrafts by selectively adjusting the position of panels and vanes extending from the spacecraft body relative to the direction of the ambient solar radiation.

In accordance with one embodiment of the present invention the method for north-south station-keeping a satellite in the equatorial plane comprises the steps of solar sailing the satellite in a first southward direction to counteract the forces tending to pull the satellite out of its orbit for a first portion of the first half of the orbit and solar sailing the satellite in a second northward direction to counteract forces tending to pull the satellite out of its orbit for a portion of the second half of the orbit.

In the drawing:

FIG. 1 is a sketch illustrating the earth's polar axis and equatorial tilt relative to the ecliptic plane in December;

FIG. 2 is a sketch of a satellite according to the present invention with solar sails;

FIG. 3 is a sketch of the satellite of FIG. 2 simultaneously crossing the equatorial and ecliptic planes and tending to follow the ecliptic path northward;

FIG. 4 is a sketch of the satellite of FIG. 2 simultaneously crossing the equatorial and ecliptic planes and tending to follow the ecliptic path southward;

FIG. 5 is a sketch of the satellite of FIG. 2 with means for rotating and tilting the solar sails;

FIG. 6 is a sketch illustrating the dimensions of the solar sails.

Referring to FIG. 1 there is illustrated the earth's polar axis tilt relative to the ecliptic plane and the sun's rays in December. Dashed line 11 represents the earth's polar axis and line 15 represents the earth's equator. The ecliptic plane is defined as the plane of the earth's orbit around the sun. The interaction of this ecliptic plane on the earth is represented by dashed line 17 which makes, as known, an angle of about 23° 27' minutes with the earth's equator. For a satellite in a low altitude orbit there is little or no effect produced by the sun so that the equilibrium orbital plane of such a satellite approaches the plane of the earth's equator because of the earth's equatorial bulge. For very high altitudes the equilibrium orbital plane approaches the ecliptic plane. At the intermediate geostationary altitude of 22,300 miles, the equilibrium orbital plane is inclined 7.35°±1.03° to lhe earth's equator, varying over the 18.61-year lunar nodal regression period, with a right ascension of the ascending node of approximately zero. Due to this equilibrium plane being inclined to the earth's equator, there is a force during one half of the orbit in the direction of arrow 19 which tends to pull the satellite northward out of the equatorial orbit plane toward the ecliptic plane. During the other half of the orbit there is a tendency for the satellite to be drawn southward from the desired equatorial orbit plane toward the ecliptic plane, as indicated by arrow 21. If station-keeping were not carried out, the satellite's orbit would precess about the stable orbit with a period of some 53 years and a maximum excursion from the equator of approximately 14.7°. Such an excursion is grossly in excess of the 0.1° permitted by the Federal Communications Commission, to meet the requirements of the satellite communications services.

In accordance with one embodiment of the invention herein, the satellite is maintained in the equatorial plane by use of solar sails which are positioned to provide correction or north-south station keeping. This station-keeping has been heretofore accomplished by the use of expendable propellants, which has greatly increased the weight of the spacecraft at launch and has limited the life of the spacecraft because of station-keeping propellant depletion.

Referring to FIG. 2, there is illustrated, for example, a solar sailing satellite according to the present invention. The satellite includes, for example, a main body 25 which may be, for example, a dual spin type satellite having a momentum wheel 25a spinning at a rate from a motor such that the main body 25 rotates only once per orbit so that a given axis of the satellite continuously points to the earth. This rotation speed is such that the satellite makes one revolution per sidereal day. The satellite is placed in the geostationary orbit in which the satellite remains fixed relative to any position on earth. The satellite herein includes a pair of flat panel sails referred to as north sail 27 and a parallel south sail 29. The sails 27 and 29 are respectively mounted from the main body 25 by support masts 31 and 32. The masts 31 and 32 are preferably rotatable and the sails are tiltable. The north and south sails are generally of identical dimension and of substantially equal distance from the center of mass of the body 25 and are generally parallel to each other. Therefore, a thrust vector is produced on two equal moment sails on opposite sides of the center of mass. This helps stabilize the satellite from any attitude changes. Slight changes in dimension of the sails or exposure of the sails to the sun which could produce imbalance can be corrected by slight trimming of the sails by tilting the sails slightly off parallel.

When the satellite, for example, is crossing the equatorial plane and having a tendency to follow the ecliptic path northward in December the sails are oriented to the sun as shown in FIG. 3 at approximately $45° \pm 10°$ relative to the direction of the solar photon pressure such that the radiation pressure due to solar photons is directed against the sails as illustrated by dashed lines 35 in FIG. 2. This produces a thrust component in the southward direction as indicated by vector line 37 which opposes the force vector represented by arrow 19. When the satellite has orbited approximately half way around the earth, has crossed the equatorial plane and then tends to follow the ecliptic path in a southward direction, the sails are oriented at about $45° \pm 10°$ to the sun's rays as illustrated in FIG. 4 such that the north and south sails 27 and 29 are tilted in an opposite direction than shown in FIG. 3, with respect to the sun's rays (illustrated by dashed line 41). The result is a thrust component in the northward direction as indicated by vector 45. This acts to counter force vector 21, to thereby keep the satellite along the equatorial orbit.

It may not be necessary to rotate the sails in the case where both sides of the sail panels 27 and 29 are reflective and the body 25 and the sails rotate once per orbit. If the sails 27 and 29 are correct in FIG. 3 and the photons hit surfaces 27a and 29a, the photons hit surfaces 27b and 29b of these sails 27 and 29 when the body and sails are rotated 180° as shown in FIG. 4.

While the optimum position of the satellite at which to apply the thrust is when it crosses the equatorial plane as shown in FIGS. 3 and 4, the thrust period required is longer than the time during which it is in this position. Accordingly the application of the solar photon pressure is made to start a given time period before the satellite crosses the equatorial plane as shown in FIGS. 3 and 4, and is stopped at a time which occurs the same given time period after the crossing. A maximum southward thrust time period would begin when the satellite begins its movement northward and stops when the satellite begins its southward movement. The maximum northward thrust time period would begin when the satellite begins its southward movement and ends when the satellite begins its northward movement, all relative to the ecliptic plane.

Referring to FIG. 5 there is illustrated a more detailed sketch of a satellite with rotatable masts and tiltable sails which includes a main body 25 and a motor 51 which is rotatably coupled to the north sail 27 and a motor 53 which is rotatably coupled between a mast 32 and south sail 29. The sails 27 and 29 as mentioned previously are mounted to rotatable masts 31 and 32 which are driven by a motor 52 for rotating the flat panel sails 27 and 28 to present the reflecting surface of the sails toward the sun and at the proper tilt angle. The sails themselves as illustrated in FIG. 6 may include a reflecting foil such as lightweight aluminum foil on a flat panel base structure, which may be a collapsible structure for stowing before deployment of the sails. Light, slightly wrinkled surfaces, such as aluminum foil or metallized plastic would be a suitable material. The motors 51, 52 and 53 may be controlled by a signal generator to provide appropriate rotation of the mast and tilting to achieve the north-south station-keeping described. This signal generator may be responsive, for example, to a clock which provides timing signals to the signal generator corresponding to the position of the satellite in orbit. Alternatively, the motors could be controlled from a ground station via the command system of the satellite.

The overall size of each of the sails 27 or 29 may be, for example, 10 by 10 meters or 100 square meters. The photon energy striking such large sails is expected to provide the amount of thrust needed for station-keeping maneuvers. The overall structure of the mast may include a base structure with foil on it which is expandable such as an umbrella-like structure. The mast may also take the form of some type of flexible fabric coated with foil, such as aluminum foil, to provide an overall lightweight expandable structure. It is recognized that abruptly tilting of sails or abruptly rotating the sails can produce disturbing torques on the satellite. To overcome this problem it is preferred that the tilting follow a sinusoidal curve with a period of one day for the geosynchronous case such that the maximum tilting of $45° \pm 10°$ to the sun's rays for maximum thrust component occurs at the ecliptic plane crossings as shown in FIGS. 3 and 4 with gradual reduction in the tilt angle to the sun's rays such as to be zero at midpoints in between. Similarly, the mast can be rotated with the satellite's antenna so it makes one revolution per day and so it produces maximum thrust at the ecliptic equatorial crossing. Slight adjustment to the tilt and/or rotation can be made to correct the orbit period, east-west position and orbit eccentricity.

The above examples illustrated in FIGS. 1, 3 and 4 were for a December case where southward sailing begins at noon when starting to go away from the sun and northward sailing begins at midnight when starting toward the sun. The opposite case is true in June when one sails southward beginning at midnight and northward beginning at noon. The phasing of the daily sail position changes therefore occurs approximately 4 minutes earlier from each day to the next.

What is claimed is:

1. A method for north-south station-keeping a satellite in the equatorial plane comprising:

solar sailing the satellite in a first southward direction to counteract the forces tending to pull the satellite out of its equatorial orbit for a portion of the first half of the orbit on successive orbits; and solar sailing the satellite in a second northward direction to counteract forces tending to pull the satellite out of its equatorial orbit for a portion of the second half of the orbit on successive orbits.

2. The method of claim 1 wherein said portion of the first half of the orbit and said portion of the second half of the orbit are equal and these portions are centered with respect to the simultaneous crossing by the satellite of the equatorial and ecliptic planes.

3. A method employing solar sails for north-south station-keeping a satellite in the equatorial plane comprising:

on each successive orbit applying solar pressure in one sense to two solar sails equally spaced from the center of the satellite and so oriented that the satellite is thrust in a southward direction to counteract the forces that tend to pull the satellite northward out of its equatorial orbit; and on each successive orbit applying solar pressure in the opposite sense to said two solar sails to oriented that the satellite is thrust in a northward direction to counteract the forces that tend to pull the satellite southward out of its equatorial orbit.

4. A space vehicle comprising, in combination: a main satellite body having a center of mass;

a pair of solar sailing flat panel sails of equal cross-section and shape, said sails extending from opposite surfaces of said main satellite body and substantially equidistant from the center of mass of said main body, said sails being mounted to said main body such that their broad planar surfaces are generally parallel to each other; and means on successive orbits for orienting said sails relative to the sun's rays at about 45°±10° and such that said satellite solar sails in a southward direction, when said satellite is in that portion of a first half of the orbit where forces tend to pull the satellite northward out of its equatorial orbit, and at about 45°±10° relative to the sun's rays and such that said satellite solar sails in a northward direction, when said satellite is in that portion of the second half of the orbit where forces tend to pull the satellite southward out of its equatorial orbit.

5. The combination of claim 4 wherein at least one broad planar surface of said solar sails is covered by light reflecting material.

6. The combination of claim 5 wherein said light reflecting material is a metal foil.

7. The combination of claim 6 wherein said metal foil is aluminum foil.

8. The combination of claim 4 wherein both broad planar surfaces of said solar sails are covered by light reflecting material.

9. The combination of claim 7 wherein said light reflecting material is a metal foil.

10. The combination of claim 9 wherein said metal foil is aluminum foil.

* * * * *